United States Patent [19]

Charlot

[11] Patent Number: 4,520,362
[45] Date of Patent: May 28, 1985

[54] POLARIZATION RATIOMETRY OBJECT DETECTION SYSTEM AND METHOD

[75] Inventor: Lincoln H. Charlot, Tampa, Fla.

[73] Assignee: Elint Corporation, St. Petersburg, Fla.

[21] Appl. No.: 428,547

[22] Filed: Sep. 30, 1982

Related U.S. Application Data

[63] Continuation of Ser. No. 140,868, Apr. 16, 1980, abandoned.

[51] Int. Cl.³ .......................... G01S 13/00; H04B 7/10
[52] U.S. Cl. ................................. 343/361; 343/5 PD; 343/17.5
[58] Field of Search ............. 340/541, 552; 343/5 CE, 343/5 PD, 5 SA, 5 SW, 7.7, 17.5, 100 PE, 100 ST, 17.2 R, 361, 362

[56] References Cited

U.S. PATENT DOCUMENTS

| | | | |
|---|---|---|---|
| 3,354,459 | 11/1967 | Schwartz et al. | 343/362 |
| 3,357,013 | 12/1967 | Hart | 343/361 |
| 3,772,689 | 11/1973 | Root | 343/5 SA |
| 3,849,781 | 11/1974 | Ort | 343/361 |
| 4,005,425 | 1/1977 | Nagy | 343/100 PE X |
| 4,008,472 | 2/1977 | Nirasawa et al. | 343/17.1 R X |
| 4,053,895 | 10/1977 | Malagisi | 343/700 MS |
| 4,146,893 | 3/1979 | Inagaki et al. | 343/100 PE |
| 4,231,037 | 10/1980 | Long | 343/100 PE X |
| 4,323,898 | 4/1982 | Barnes et al. | 343/100 PE X |
| 4,333,008 | 6/1982 | Misek | 343/100 PE X |

FOREIGN PATENT DOCUMENTS 1804896 9/1969 Fed. Rep. of Germany .

OTHER PUBLICATIONS

Skolnik, "Radar Handbook", McGraw-Hill Book Co., New York, 1970, pp. 3-15, thru 3-38.

Primary Examiner—Maynard R. Wilbur
Assistant Examiner—K. R. Kaiser
Attorney, Agent, or Firm—Baker, Maxham, Callan & Jester

[57] ABSTRACT

A method and system for detecting objects having preferential polarization plane reflection characteristics. The method includes the steps of: (a) transmitting from a first given location, a first plane-polarized electromagnetic wave that is oriented in a predetermined reference plane; (b) transmitting from the first given location a second electromagnetic wave having the same frequency and intensity as the first wave and not being oriented in the predetermined reference plane: (c) receiving at a second given location, reflections of the first transmitted wave to provide a first received signal; (d) receiving at the second given location, reflections of the second transmitted wave to provide a second received signal; and (e) comparing the first received signal to the second received signal for detecting an object that preferentially reflects the transmitted radiation in a distinct plane so as to distinguish such object from other objects not having such characteristics. Movement of the detected object is detected by detecting a change in the results of such comparison. The first and second transmitted waves are shifted in phase to be in phase with each other, with the degree of such phase shift being varied periodically to avoid consistent multipath wave cancellations and reinforcements. The first and second waves are transmitted by a carrier signal at the frequency of the first and second waves. The carrier signal is modulated for transmission by a modulation signal having a lower modulation frequency. The received signals are mixed with the unmodulated carrier signal to provide the received signals at the modulation frequency.

8 Claims, 10 Drawing Figures

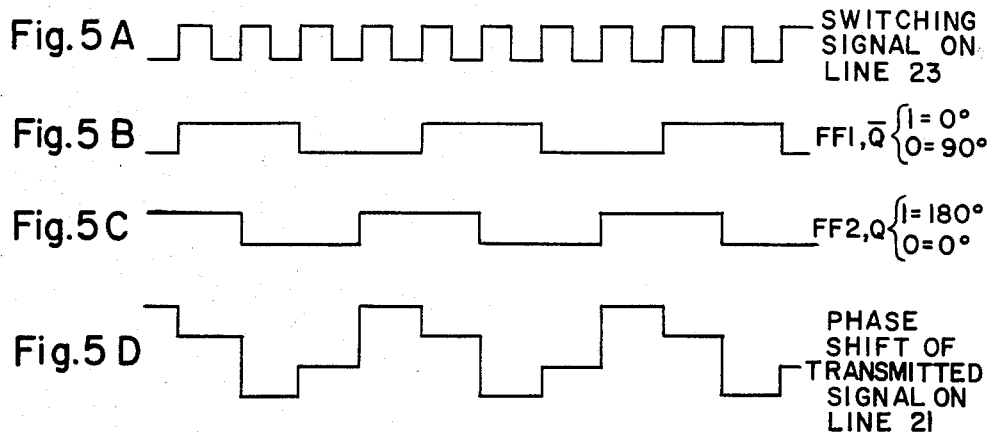
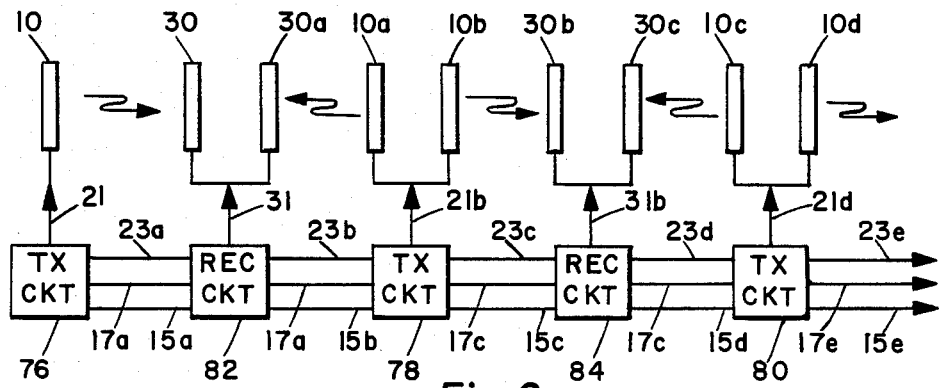
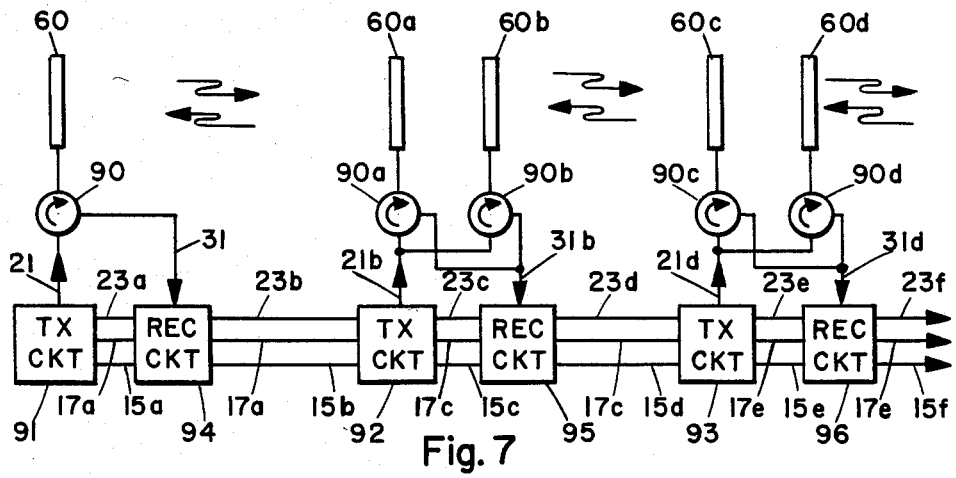

POLARIZATION RATIOMETRY OBJECT DETECTION SYSTEM AND METHOD

This is a continuation of application Ser. No. 140,868 filed Apr. 16, 1980, now abandoned.

BACKGROUND OF THE INVENTION

The present invention generally pertains to communications systems and methods, and is particularly directed to detection of objects having preferential polarization plane reflection characteristics.

It often is desired to detect the presence of human beings, especially when the humans are within restricted areas. It also is desired to be able to detect other objects, such as guided missiles or aircraft flying parallel to the Earth's surface at relatively low altitudes.

Detection systems based upon the well known Doppler principle are capable of detecting human movement. Doppler systems detect a moving object by sensing a shift in the frequency of microwave energy reflected from the moving object. However, Doppler system also detect blowing rain, snow and sand, waving grass and other moving environmental objects and provides the same type of indications upon detecting such environmental objects as when a moving human is detected.

Conventional radar systems are located in a space satellite or a high-flying aircraft are not capable of detecting guided missiles flying at low altitudes parallel to the Earth's surface because the intensity of microwave energy reflections due to environmental ground clutter is comparable to the intensity of the microwave energy reflections from a missile, whereby such reflections are virtually indistinguishable from each other. One state-of-the art technique for distinguishing missle reflections from ground clutter reflections is to utilize ranging gates, whereby only objects at the range of the missile are detected. However, when the missile flies between hills at a lower altitude than the hilltops, either both the hills and the missile are sensed, or both are masked.

SUMMARY OF THE INVENTION

The present invention is a method and system utilizing polarization ratiometry for detecting objects having preferential polarization plane reflection characteristics. The method of the present invention includes the steps of:

(a) transmitting from a first given location, a first plane-polarized electromagnetic wave that is oriented in a predetermined reference plane;

(b) transmitting from the first given location, a second electromagnetic wave having the same frequency and intensity as the first wave and not being oriented in the predetermined reference plane;

(c) receiving at a second given location, reflections of the first transmitted wave to provide a first received signal;

(d) receiving at the second given location, reflections of the second transmitted wave to provide a second received signal; and (e) comparing the first received signal to the second received signal for detecting an object that preferentially reflects said transmitted radiation in a distinct plane so as to distinguish such object from other objects not having such characteristics. Movement of the detected object is detected by the further step of detecting a change in the results of such comparison. It is preferred that the second transmitted electromagnetic wave also be plane-polarized.

The first and second transmitted waves are shifted in phase to be in phase with each other, with the degree of such phase shift being varied periodically to avoid consistent multipath wave cancellations and reinforcements.

The first and second waves are transmitted by a carrier signal at the frequency of the first and second waves. The carrier signal is modulated for transmission by a modulation signal having a lower modulation frequency. The received signals are mixed with the unmodulated carrier signal to provide the received signals at the modulation frequency. The system of the present invention thus provides superheterodyne receiver operation without having to provide an additional IF oscillator in the receiver system.

Human beings, because of their arms, legs and body outline, tend to reflect energy preferentially in one polarization plane or another. On the other hand, blowing rain, snow, and said waving grass and various small objects, such as birds, and rabbits, do not so reflect. Thus, polarization ratiometry provides the means to overcome the false alarm problems associated with traditional Doppler microwave systems that do sense these nonhuman elements found in most environments.

Although the present invention is useful for detecting stationary objects that reflect energy preferentially in one plane or another, the present invention is particularly applicable for detecting the movement of such objects. One such application is intrusion detection, specifically human movement into restricted areas. The movement of a human is readily detected in accordance with the present invention by detecting a change in the comparison of the signals derived from reflections of the transmitted waves having different planes of polarization.

The present invention also is useful for detecting missiles or aircraft flying at low altitudes because there is no change in the preferential polarization of electromagnetic waves reflected from the background Earth environment when such waves are transmitted from and reflected to a high altitude. Another application of the present invention is to reduce sea wave radar clutter. Sea waves generally move in a given direction and such would produce a given "offset" in polarization ratio magnitude. When a low flying aircraft or missile enters the radar beam, its polarization ratio is greatly different from that of the sea wave.

Additional features and advantages of the present invention are discussed in relation to the description of the preferred embodiments.

BRIEF DESCRIPTION OF THE DRAWINGS

FIGS. 5A, 5B, 5C and 5D illustrate the waveforms of signals that operate the QPSK phase shifter in the transmitter system of FIG. 1.

FIG. 6 schematically illustrates a bi-static array of polarization ratiometry detection systems.

FIG. 7 schematically illustrates a mono-static array of polarization ratiometer detection systems.

DESCRIPTION OF THE PREFERRED EMBODIMENTS

Figure 1:
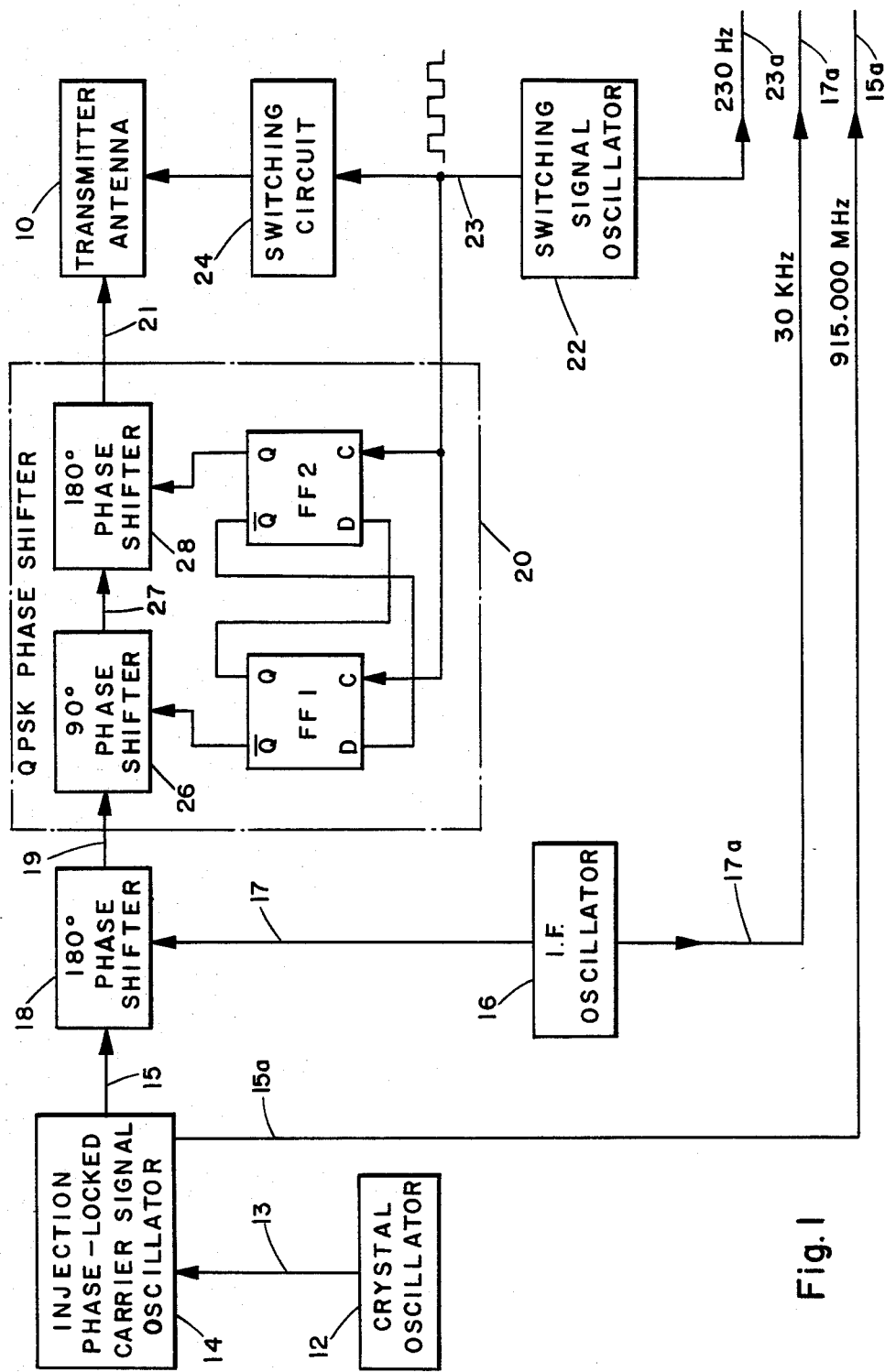
FIG. 1 is a schematic block diagram of a preferred embodiment of the transmitter system of the present invention.

The preferred embodiment of the system of the present invention is useful for detecting the movement of objects having preferential polarization plane reflection characteristics. This embodiment includes a transmitter system illustrated in FIG. 1 and a receiver system illustrated in FIG. 2.

The transmitter system includes a transmitter antenna 10, a crystal oscillator 12, an injection phase-locked carrier signal oscillator 14, an IF oscillator 16, a 180 degree phase shifter 18, a QPSK phase shifter 20, a switching signal oscillator 22, and a switching circuit 24. The QPSK phase shifter 20 includes a pair of D flip-flops FF1 and FF2, a 90 degree phase shifter 26 and a 180 degree phase shifter 28.

The receiver system (FIG. 2) includes a receiver antenna 30, a switching signal phase-locked oscillator 32, a switching circuit 34, an injection phase-locked carrier signal oscillator 36, a filter circuit 38, a double balanced mixer 40, an IF amplifier and detector 42, a two-channel demultiplexer and sample and hold circuit 44, a comparator 48 and a change of level detector 50.

The transmitter antenna 10 is adapted for transmitting electromagnetic energy waves. Such waves may be in a range of from approximately 100 KHZ radio waves up to and including light waves. In the preferred embodiment, the transmitted waves are radio frequency RF waves having a carrier frequency of 915.000 MHZ.

Figure 2:
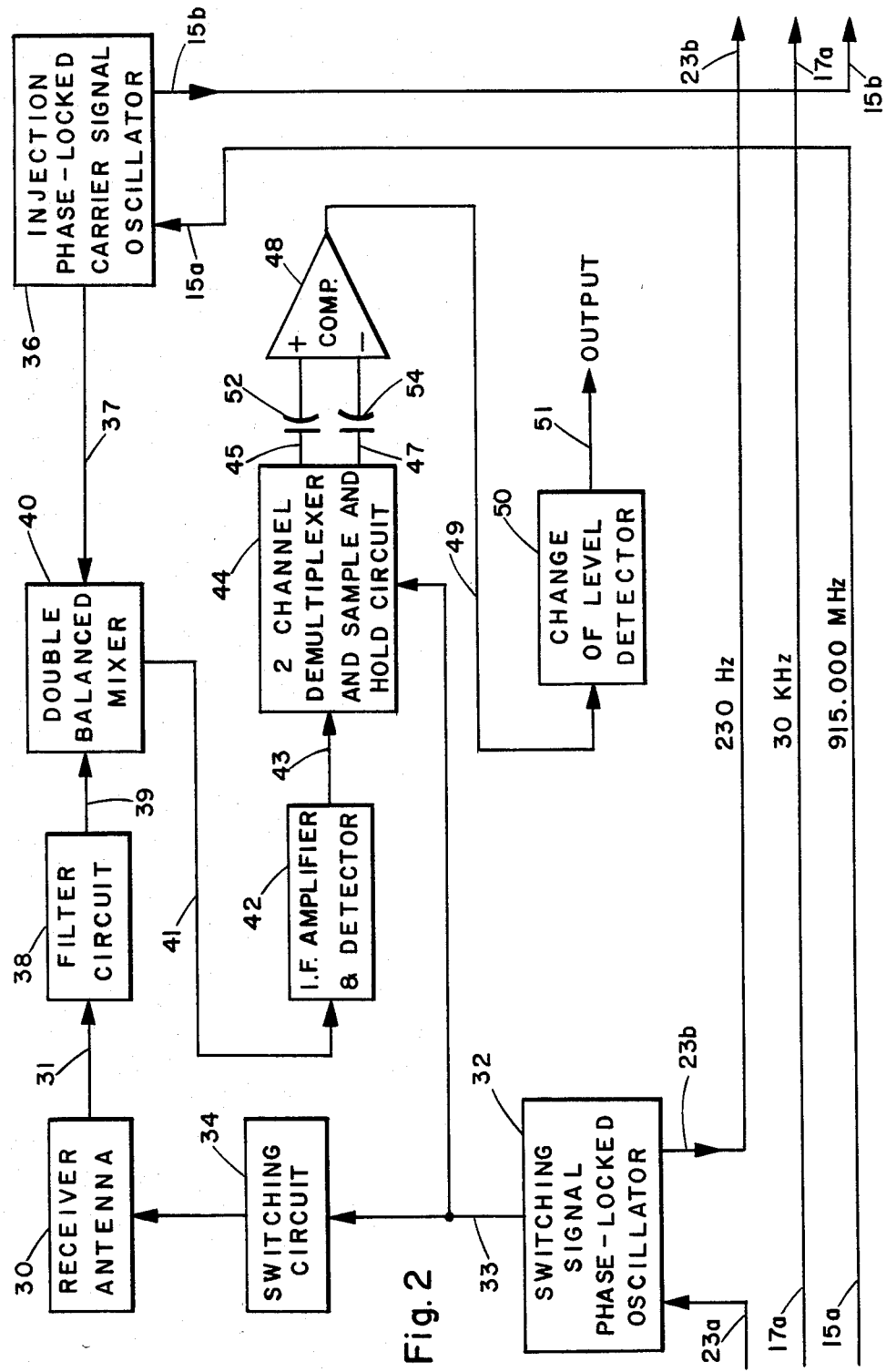
FIG. 2 is a schematic block diagram of a preferred embodiment of the receiver system of the present invention for use in combination with the transmitter system of FIG. 1.

The crystal oscillator 12 generates a 915.000 MHZ signal, which is provided via the line 13 to the injection phase-locked carrier signal oscillator 14. The oscillator 14 provides a 915.000 MHZ carrier signal on the line 15, and further provides a 915.000 MHZ reference signal in phase therewith on the line 15a to the injection phase-locked carrier signal oscillator 36 of the receiver system (FIG. 2). The oscillator 36 provides a 915.000 MHZ carrier signal on the line 37 that is in phase with the carrier signal on the line 15a and further provides a 915.000 MHZ reference signal on the line 15b in phase therewith.

The IF oscillator generates a 30 KHZ modulation signal and provides the modulation signal to the 180 degree phase shifter 18 via the line 17. The IF oscillator also provides a 30 KHZ reference signal on the line 17a in phase with the modulation signal on the line 17. This 30 KHZ reference signal is used to synchronize the modulation of other transmitter systems used in combination with the transmitter system of FIG. 1. Such conbinations are described later with reference to FIGS. 6 and 7. The frequency of the modulation signal may be other than 30 KHZ, but it must be lower than the frequency of the carrier signal on line 15.

The 180 degree phase shifter 18 functions as a modulator and responds to the 30 KHZ modulation signal on the line 17 by modulating the carrier signal on line 15 by shifting the phase of the carrier signal by 180 degrees at a 30 KHZ rate. The modulated carrier signal is provided to the transmitter antenna 10 via the line 19, the QPSK phase shifter 20 and the line 21. As a result, the phase of the 915.000 MHZ waves transmitted by the transmitter antenna 10 is shifted 180 degrees at a 30 KHZ rate.

In the receiver system (FIG. 2), the receiver antenna 30 is adapted for receiving reflections of the modulated waves transmitted by the transmitter antenna 10 and for providing a received signal on the line 31 in response thereto. The received signal on line 31 is passed through a filter circuit 38, which includes both an RF filter and a band pass filter; and a filtered received signal is thereby provided on the line 39.

An intermediate frequency signal is provided in response to the received signal on the line 39 by a super heterodyning technique. The double balanced mixer 40 mixes the received signal on the line 39 with the 915.000 MHZ carrier signal on the line 37 and thereby produces a received signal on the line 41 at the modulation frequency of 30 KHZ. The system of the present invention thus provides superheterodyne receiver operation without having to provide an additional local IF oscillator in the receiver system.

The received signal on the line 41 is passed through an IF amplifier and detector 42 to provide a detected received signal on the line 43.

Both the first and second electromagnetic waves are plane polarized, and both are transmitted by a single transmitter antenna 10. This is accomplished by alternatively switching the preferential polarization plane of the transmitter antenna 10 at a predetermined alternation rate. Likewise a single receiver antenna 30 is used in the receiver system to receive reflections of both the first and second electromagnetic waves transmitted by antenna 10. The preferential polarization plane of the receiver antenna 30 is alternatively switched at the predetermined alternation rate in synchronization with the switching of the preferential polarization planes of the transmitter antenna 10.

It is assumed that the target object is sensed in the two planes fast enough so as to be viewed as stationary even though it may be a fast moving object, such as a missile. In the preferred embodiment, the polarization plane is switched at approximately 230 times per second in response to a switching signal provided on the line 23 from the switching signal oscillator 22. The oscillator provides the 230 HZ switching signal on the line 23 and further provides a 230 HZ reference signal in phase therewith via the line 23a to the switching signal phase-locked oscillator 32 in the receiver system. The oscillator 32 provides a 230 HZ switching signal on the line 33 in phase with the switching signal on the line 23 from the switching circuit oscillator 22 in the transmitter system, and further provides a 230 HZ reference signal on the line 23b in phase therewith.

The switching circuit 24 is coupled to the transmitter antenna 10 and is adapted for alternatively switching the preferential polarization plane of the transmitter antenna 10, in response to the switching signal on the line 23 to cause the transmitter antenna 10 to alternatively transmit the first and second waves at the 230 HZ alternation rate of the switching signal on the line 23.

The switching circuit 34 is coupled to the receiver antenna 30 and is adapted for alternatively switching the preferential polarization plane of the receiver antenna 30 in response to the switching signal on the line 33 at the 230 HZ alternation rate to cause the preferential polarization plane of the receiver antenna 30 to alternatively coincide with the respective polarization planes of the waves transmitted by the transmitter antenna 10.

The 2-channel demultiplexer and sample and hold circuit 44 demultiplexes the detected signal on the line 43 to separate the first received signal from the second received signal in response to the switching signal on line 33 at the 230 HZ alternation rate to thereby enable comparison of the first and second received signals. The first separated signal is sampled and held on the line 45 until the second received signal is sampled by the circuit 44 and provided on the line 47 so that the first and second received signals are provided simultaneously for purposes of comparison. Coupling capacitors 52 and 54 are provided respectively in the lines 45 and 47 between the demultiplexer circuit 44 and the comparator circuit 48 to eliminate offset signals due to strong stationary reflectors, such as vehicles or fences.

The comparator 48 provides a signal on the line 49 that is responsive to the comparison of the respective first and second received signals on the lines 45 and 47. The signal on the line 49 remains at zero until an object having a preferential polarization plane moves into the view of the receiver antenna. The resulting change in the level of the signal on the line 49 that occurs in response to such movement is detected by the change of level detector 50, which responds by providing an alarm signal on its output line 51.

Were it not for the coupling capacitors 52 and 54, the comparator would provide a signal offset from zero on the line 49 whenever electromagnetic wave reflections were received by the receiver antenna 30 from stationary objects having preferential polarization plane reflection characteristics.

Figure 3:
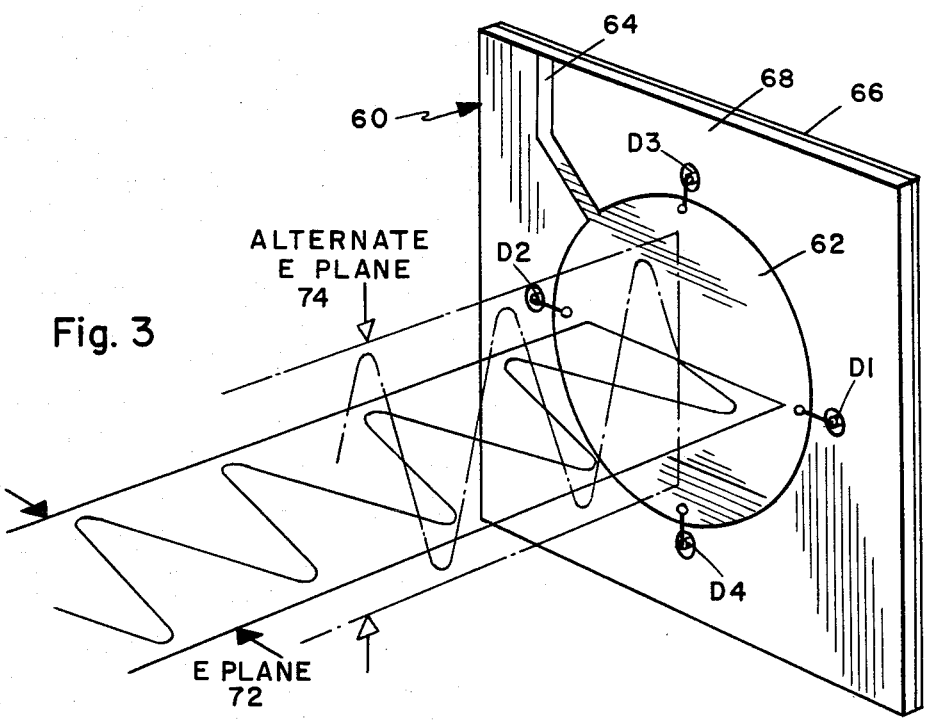
FIG. 3 is a perspective and partially schematic view of an antenna used in the transmitter and receiver systems of the present invention.
Figure 4:
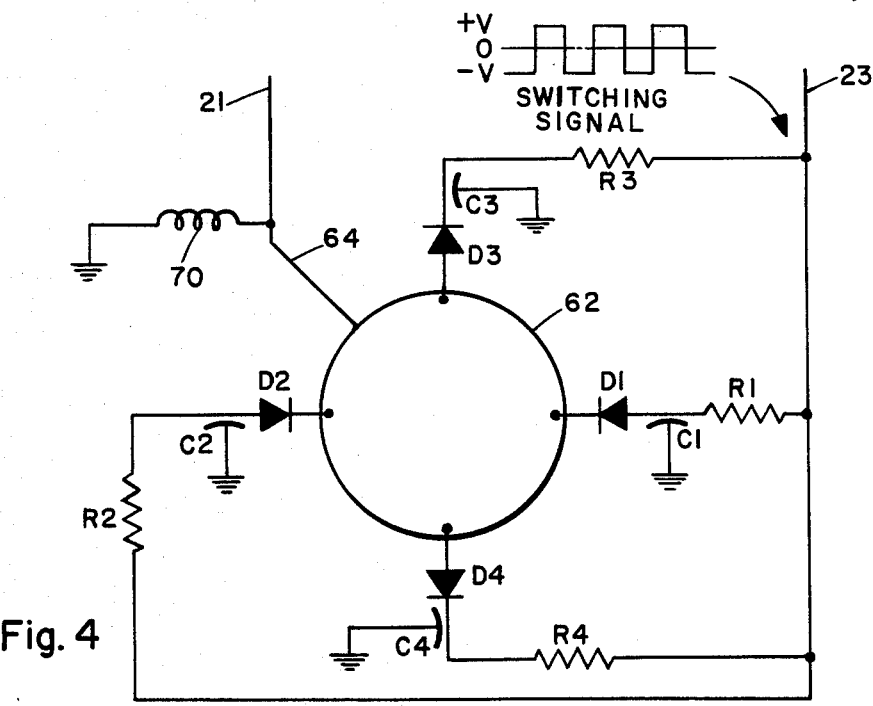
FIG. 4 is a schematic circuit diagram of the antenna of FIG. 3 in combination with a switching-circuit as shown in FIGS. 1 and 2, for switching the preferential polarization plane of such antenna.

The preferred embodiment of the transmitter antenna 10 and the switching circuit 24 is illustrated in FIGS. 3 and 4. The transmitter antenna 10 is a microstrip antenna 60 having a circular conductive radiator element 62 and an RF feed element 64, a conductive ground plane element 66, and a layer of dielectric material 68 separating the ground plane element 66 from the radiator element 62 and the RF feed element 64. The modulated carrier signal on the line 21 is applied to the RF feed element 64.

The switching circuit 24 includes a coil 70 for providing a DC ground connection to the RF feed element 64, a first pair of PIN diodes D1 and D2 and a second pair of PIN diodes D3 and D4. The PIN diodes D1 and D2 have their respective cathodes connected to a first pair of diametrically opposed points on the periphery of the circular radiator element 62 and their respective anodes coupled by current limiting resistors R1 and R2 and RF by-pass capacitors C1 and C2 to the switching signal line from the switching signal oscillator 22.

The PIN diodes D3 and D4 have their respective anodes connected to a second pair of diametrically opposed points on the periphery of the circular radiator element 62 and their respective cathodes coupled by current limiting resistors R3 and R4 and RF by-pass capacitors C3 and C4 to the switching signal line 23.

The switching signal on the line 23, as shown in FIG. 4, is a square wave alternating between a positive voltage, $+V$ with respect to DC ground, and a negative voltage, $-V$ with respect to DC ground. When the switching signal is at $+V$, the first pair of PIN diodes D1 and D2 are forward biased and the second pair of PIN diodes D3 and D4 are reverse biased. When the switching signal is at $-V$, the second pair of PIN diodes D3 and D4 are forward biased and the first pair of PIN diodes D1 and D2 are reverse biased.

The first pair of PIN diodes D1 and D2 responds to the switching signal on line 23 by alternatively biasing the first pair of diametrically opposed points on the periphery of the circular radiator element 62 to alternatively connect the first pair of points to DC ground when reverse biased.

The second pair of PIN diodes D3 and D4 responds to the switching signal on the line 23 by alternatively biasing the second pair of diametrically opposed points on the periphery of the circular radiator element 62 to alternatively create an open circuit between the second pair of points and DC ground when an open circuit is created between the first pair of points and DC ground, or connect the second pair of points to DC ground when an open circuit is created between the first pair of points and DC ground.

A preferential polarization plane is provided between whichever pair of points on the periphery of the circular radiator element 62 is open-circuited to DC ground. Thus an E plane of preferential polarization 72 is created between the pair of points connected to the pair of PIN diodes D1 and D2 when the PIN diodes D1 and D2 are reverse biased in response to the switching signal on line 23 being at $-V$ volts; and an alternate E place of preferential polarization 74 is created between the pair of points connected to the pair of PIN diodes D3 and D4 when the PIN diodes D3 and D4 are reverse biased in response to the switching signal on the line 23 being at $+V$ volts.

Accordingly, the transmitter antenna 10 is switched to alternatively transmit electromagnetic radiation waves in either the E plane 72 or the alternate E plane 74 at an alternation rate of 230 HZ.

The receiver antenna 30 and the switching circuit 34 are constructed in the same manner as the transmitter antenna 10 and the switching circuit 24 described above with reference to FIGS. 3 and 4. In the receiver system, the RF feed line 64 is connected to the output line 31 to the filter circuit 38; and the switch signal line 23 of the switching circuit shown in FIG. 4 is the same as the switching signal line 33 from the switching signal oscillator 32.

The operation of the QPSK (quada-phase-shift-keying) phase shifter 20 in the transmitter system is described with reference to FIGS. 5A through 5D. The QPSK phase shifter 20 periodically shifts the phase of the carrier signal on the line 19 in order to avoid consistent multipath wave cancellations and reinforcements, such as occur when reflected radiation travels along multiple paths of unequal length to the receiver antenna 30. Signal cancellation often occurs due to multiple reflections from environmental objects, especially when the radiation is transmitted along an axis that is relatively parallel to the Earth's surface.

The flip-flops FF1 and FF2 of the QPSK phase shifter 20 are clocked by the switching signal on the line 23. Referring to FIG. 5A, it is seen that the switching signal is a square wave that alternates between a logic "1" and a logic "0".

The Q output of the flip-flop FF1 is connected to the D input of the flip-flop FF2; and the $\overline{Q}$ output of the flip-flop FF2 is connected to the D input of the flip-flop FF1.

The 90 degree phase shifter 26 responds to the signal appearing at the $\overline{Q}$ output of the flip-flop FF1 in accordance with the relationship shown in FIG. 5B. When the $\overline{Q}$ output of the flip-flop FF1 is at logic "1", the phase shift in the carrier signal on the line 19 provided on the line 27 by the 90 degree phase shifter 26 is zero degrees; and when the $\overline{Q}$ output of the flip-flop FF1 is at logic "0", the phase shift in the carrier signal on the line 19 provided on the line 27 by the 90 degree phase shifter 26 is 90 degrees.

The 180 degree phase shifter 28 responds to the signal appearing at the Q output of the flip-flop FF2 in accordance with the relationship shown in FIG. 5C. When the Q output of the flip-flop FF2 is at logic 1, the phase shift in the signal on the line 27 provided on the line 21 by the 180 degree phase shifter is 180 degrees; and when the Q output of the flip-flop FF2 is at logic "0", the phase shift in the signal on the line 27 provided on the line 21 by the 180 degree phase shifter is zero degrees.

The FIG. 5D shows the cumulative phase shift in the transmitted RF carrier signal on line 21 provided by the 90 degree phase shifter 26 and the 180 degree phase shifter 28 upon the RF carrier signal on the line 19. It is seen that the phase is shifted periodically in alternative increments of 90 degrees and 180 degrees. Even if phase cancellation should occur at any given phase, it is unlikely that it will occur at the other three phases. The alternate phase shift increments of 180 degrees are provided, because cancellation conditions resulting in signal nulls are more readily overcome by switching the phase a full 180 degrees.

Referring to FIGS. 5A and 5D, it is observed that the switching signal occurs in both states during any given degree of phase shift. Thus the transmitter antenna 10 and the receiver antenna 30 are switched to operate in both of their preferential polarization planes during any given degree of phase shift so that the first and second received signals compared by the comparator 48 are derived from first and second electromagnetic waves that were transmitted with the same degree of phase shift.

Arrays of transmitting antenna 10 and receiving antennas 30 may be used to provide surveillance against intrusion of a large area. The array is said to be in a bi-static mode when the transmitter antennas 10 and the receiver antennas 30 are deployed at separate locations. The array is in mono-static mode when transmitter antennas 10 are respectively deployed at the same locations as the receiver antennas 30.

A bi-static array is shown in FIG. 6. It includes a plurality of transmitter antennas 10, 10a, 10b, 10c, 10d, . . . , and a plurality of receiver antennas 30, 30a, 30b, 30c, . . . . The transmitter antenna 10 is connected to a transmitter circuit 76, such as shown in FIG. 1. The transmitter antennas 10a and 10b are connected to a transmitter circuit 78; and the transmitter antennas 10c and 10d are connected to a transmitter circuit 80. The receiver antennas 30 and 30a are connected to the receiver circuit 82. Additional transmitter antennas and circuits and receiver antennas and circuits in this array are not shown. The receiver antenna 30 is positioned for receiving reflections of waves transmitted by the transmitter antenna 10a; the receiver antenna 30b is positioned for receiving reflections of waves transmitted by the transmitter 10b; etc.

Each of the receiver circuits 82 and 84 is the same as the receiver circuits shows in FIG. 2, except for being adapted for receiving signals from two different antennas.

The transmitter circuits 78 and 80 are the same as the transmitter circuit shown in FIG. 1 with the following exceptions. The IF oscillator 16 is replaced in the transmitter circuits 78 and 80 with a phase locked oscillator that responds to the 30 KHZ reference signal provided on the line 17a or 17c respectively and provides both a 30 KHZ modulation signal to the corresponding 180 degree modulation phase shifer in the transmitter circuit and a 30 KHZ reference signal on the line 17c from the transmitter circuit 78 and on the line 17e from the transmitter circuit 80, respectively. All of the 30 KHZ modulation signals provided in the different transmitter circuits 76, 78, 80 and all of the 30 KHZ reference signals provided on the lines 17a, 17c, 17e are in phase with each other. Another exception is that the switching signal oscillator 22 is replaced in the transmitter circuits 78 and 80 with a switching signal phase-locked oscillator, such as the switching signal phase-locked oscillator 32 in the receiver system shown in FIG. 2. Each such switching signal oscillator not only provides a 230 HZ switching signal to its corresponding switching circuit, such as the switching circuit 24, but further provides a 230 HZ reference signal in phase therewith on the respective lines 23c and 23e. All of the 230 HZ switching signals provided in the transmitter circuits 76, 78, 80 and in the receiver circuits 82, 84 and all of the 230 HZ reference signals on the lines 23a, 23b, 23c, 23d, 23e are in phase with each other. As a result all of the waves transmitted by the transmitter antennas 10, 10a, 10b, 10c, 10d . . . in response to the carrier signals provided on lines 21, 21b, 21d from the respective transmitter circuits 76, 78, 80 and all of the received signals produced in the receiver circuits 82, 84 from the lines 31, 31b in response to receipt by the receiver antennas 30, 30a, 30b, 30c of reflections of such transmitted waves are in phase with each other. Thus there is no interference between the waves transmitted by the different antennas 10, 10a, 10b, 10c, 10d, whereas in Doppler systems, different antennas in a close array must transmit at different frequencies to avoid interferring with each other.

A preferred embodiment of a bi-static array is shown in FIG. 7. It includes a plurality of antennas 60, 60a, 60b, 60c, 60d, . . . that are used for both transmitting and receiving. Each such antenna is coupled through a respective circulator 90, 90a, 90b, 90c, 90d, . . . to a transmitter circuit 91, 92, 93 and a receiver circuit 94, 95, 96 as shown in FIG. 7. Additional antennas, transmitter circuits and receiver circuits in this array are not shown.

Antennas 60 and 60a are positioned for receiving reflections of waves transmitted by each other; antennas 60b and 60c are positioned for receiving reflections of waves transmitted by each other; etc.

The receiver circuits 94, 95, 96 are the same as the receiver circuit shown in FIG. 2, except for being adapted for receiving signals from two different antennas.

The transmitter circuit 91 is the same as the transmitter circuit shown in FIG. 1, since it is the first transmitter circuit in a series of transmitter and receiver circuits. The transmitter circuits 92, 93 are the same as the transmitter circuits 78, 80 described above with reference to FIG. 6. In-phase reference signals are provided on the respective lines 15a, 15b, 15c, 15d, 15e, 15f; 17a, 17c, 17e; and 23a, 23b, 23c, 23d, 23e, 23f between the respective transmitter circuits 91, 92, 93 and receiver circuits 94, 95, 96 in the same manner as described above in relation to the bi-static embodiment shown in FIG. 6.

All of the waves transmitted by the antennas 60, 60a, 60b, 60c, 60d, . . . in response to the carrier signals provided on the lines 21, 21b, 21d from the respective transmitter circuits 91, 92, 93 and all of the received signals produced in the receiver circuits 94, 95, 96 from the lines 31, 31b, 31d in response to receipt by the antennas 60, 60a, 60b, 60c, 60d of reflections of such transmitted waves are in phase with each other.

The bi-static embodiment is preferred in a perimeter application, such as along a fence; whereas the monostatic embodiment is preferred for critical area applications, such as warehouses. A multiple polarization plane capability may also be accomplished with two or more antennas continually sensing the target. However, if the target is close in range relative to the distance between the antennas (as is the case in human motion detection) an ambiguity arises. Because of the distance between the antennas, a different "view" of the target and background are obtained from each antenna causing an error in ratio. For this reason, the switched plane antenna described above, which has a phase center exactly at the same point for both planes, is preferred.

Also the present invention is operable even if only one of the transmitted electromagnetic waves is plane polarized. The other transmitted wave may be circular polarized, for example, it is preferred, however, that all of the transmitted waves be plane polarized so as to enhance the chances of detecting objects having a preferential polarization plane character notwithstanding the object's particular orientation in relation to the polarization plane of the transmitted waves.

I claim:

1. A method for detecting objects having preferential polarization plane reflection characteristics, comprising the steps of:
    (a) transmitting from a first given location, a first plane-polarized electromagnetic wave that is oriented in a predetermined reference plane;
    (b) transmitting from the first given location, a second electromagnetic wave having the same frequency and intensity as the first wave and not being oriented in the predetermined reference plane;
    (c) receiving at a second given location, reflections of the first transmitted wave to provide a first received signal;
    (d) receiving at the second given location, reflections of the second transmitted wave to provide a second received signal;
    (e) comparing the first received signal to the second received signal for detecting an object that preferentially reflects said transmitted electromagnetic waves in a distinct plane so as to distinguish such object from other objects not having such characteristics;
    (f) shifting the phase of the first electromagnetic wave;
    (g) shifting the phase of the second electromagnetic wave to be in phase with the first electromagnetic wave; and
    (h) periodically varying the degree of said phase shift of the first and second waves to avoid consistent multipath wave cancellations and reinforcements.

2. A method according to claim 1, wherein said phase shift is varied periodically in alternate increments of 90 degrees and 180 degrees.

3. A method for detecting objects having preferential polarization plane reflection characteristics, comprising the steps of:
    (a) transmitting from a first given location, a first plane-polarized electromagnetic wave that is oriented in a predetermined reference plane;
    (b) transmitting from the first given location, a second electromagnetic wave heating the same frequency and intensity as the first wave and not being oriented in the predetermined reference plane;
    (c) receiving at a second given location, reflections of the first transmitted wave to provide a first received signal;
    (d) receiving at the second given location, reflections of the second transmitted wave to provide a second received signal;
    (e) comparing the first received signal to the second received signal for detecting an object that preferentially reflects said transmitted electromagnetic waves in a distinct plane so as to distinguish such object from other objects not having such characteristics;
    (f) providing a carrier signal at the transmission frequency of the first and second electromagnetic waves for causing the waves to be transmitted at said frequency;
    (g) providing a modulation signal at a modulation frequency that is lower than said transmission frequency;
    (h) modulating the carrier signal for transmission in response to the modulation signal for causing the first and second electromagnetic waves to be modulated at said modulation frequency; and
    (i) mixing the received signals with the unmodulated carrier signal to provide the received signals at said modulation frequency.

4. A method according to claim 3, wherein step (h) comprises the step of:
    (a) shifting the phase of the carrier signal by 180 degrees at the frequency of the modulation signal.

5. A system for detecting objects having preferential polarization plane reflection characteristics, comprising transmitter means for transmitting from a first given location, a first plane-polarized electromagnetic wave that is oriented in a predetermined reference plane, and a second electromagnetic wave having the same frequency and intensity as the first wave and not being oriented in the predetermined reference plane;
    receiver means for receiving at a second given location, reflections of the first transmitted wave to provide a first received signal, and reflections of the second transmitted wave to provide a second received signal;
    comparator means for comparing the first received signal to the second received signal for detecting an object that preferentially reflects said transmitted electromagnetic waves in a distinct plane so as to distinguish such object from other objects not having such characteristics; and
    phase-shifter means for shifting the phase of the first electromagnetic wave and for shifting the phase of the second electromagnetic wave to be in phase with the first elecromagnetic wave, and for periodically varying the degree of said phase shift of the first and second waves to avoid consistent multipath wave cancellations and reinforcements.

6. A system according to claim 5, wherein the phase-shifter means are adapted for varying said phase shift periodically in alternative increment of 90 degrees and 180 degrees.

7. A system for detecting objects having preferential polarization plane reflection characteristics, comprising
transmitter means for transmitting from a first given location, a first plane-polarized electromagnetic wave that is oriented in a predetermined reference plane, and a second electromagnetic wave having the same frequency and intensity as the first wave and not being oriented in the predetermined reference plane;
receiver means for receiving at a second given location, reflections of the first transmitted wave to provide a first received signal, and reflections of the second transmitted wave to provide a second received signal;
comparator means for comparing the first received signal to the second received signal for detecting an object that preferentially reflects said transmitted electromagnetic waves in a distinct plane so as to distinguish such object from other objects not having such characteristics;
first circuit means for providing a carrier signal at the transmission frequency of the first and second electromagnetic waves for causing the waves to be transmitted at said frequency;
second circuit means for providing a modulation signal at a modulation frequency that is lower than said transmission frequency;
modulator means for modulating the carrier signal for transmission in response to the modulation signal for causing the first and second elecromagnetic waves to be modulated at said modulation frequency; and
mixer means for mixing the received signals with the unmodulated carrier signal to provide the received signals at said modulation frequency.

8. A system according to claim 7, wherein the modulator means comprises
phase-shifter means responsive to the modulation signal for shifting the phase of the carrier signal by 180 degrees at the frequency of the modulation signal.

* * * * *